United States Patent Office 2,963,097
Patented Dec. 6, 1960

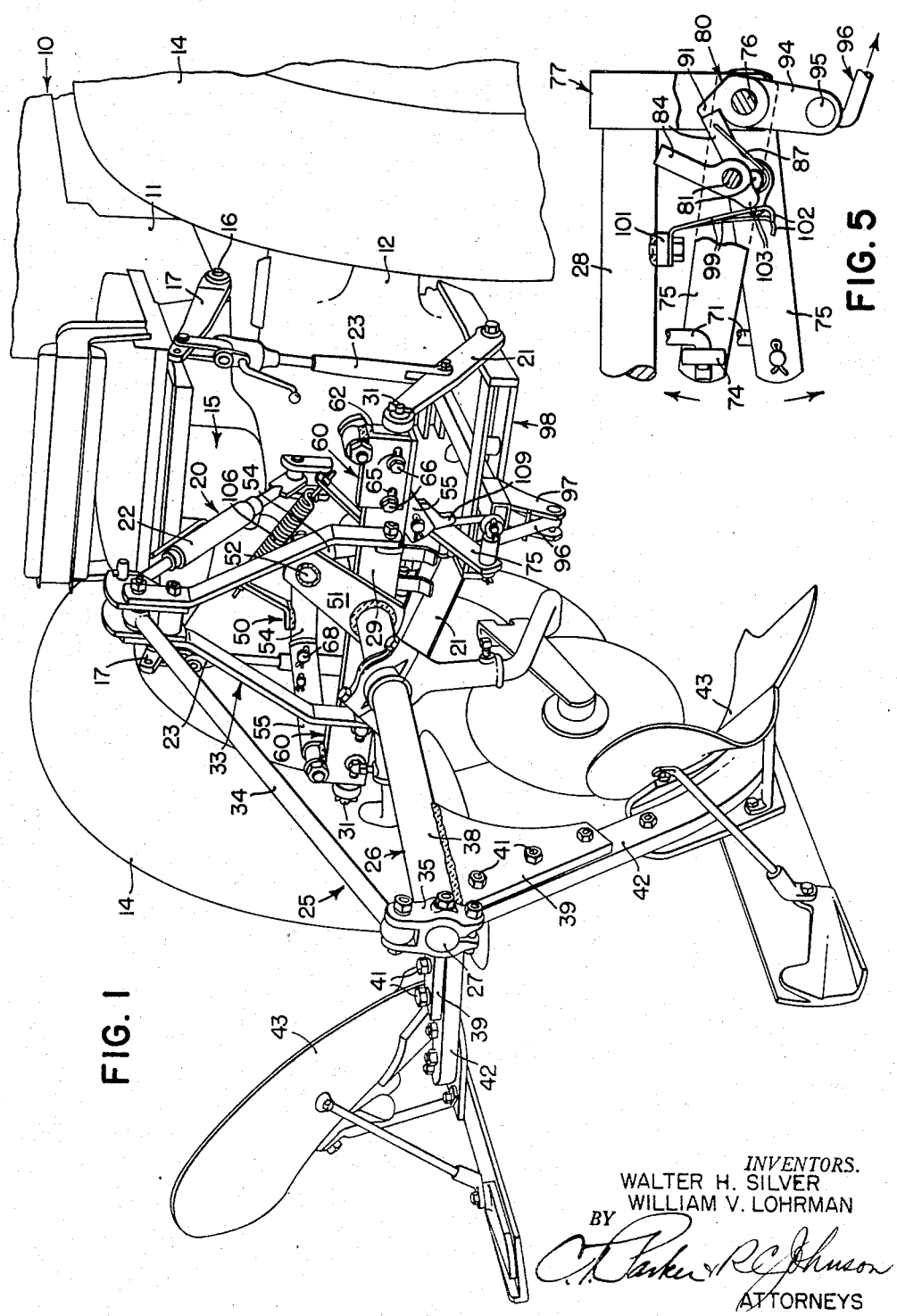

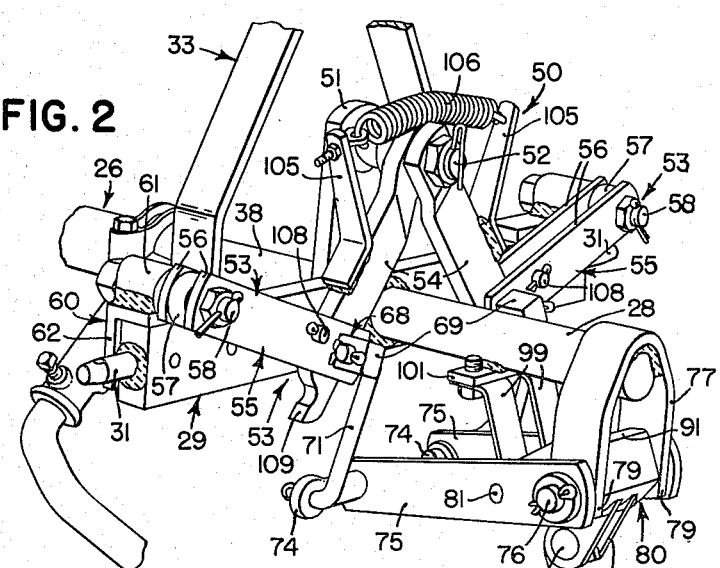
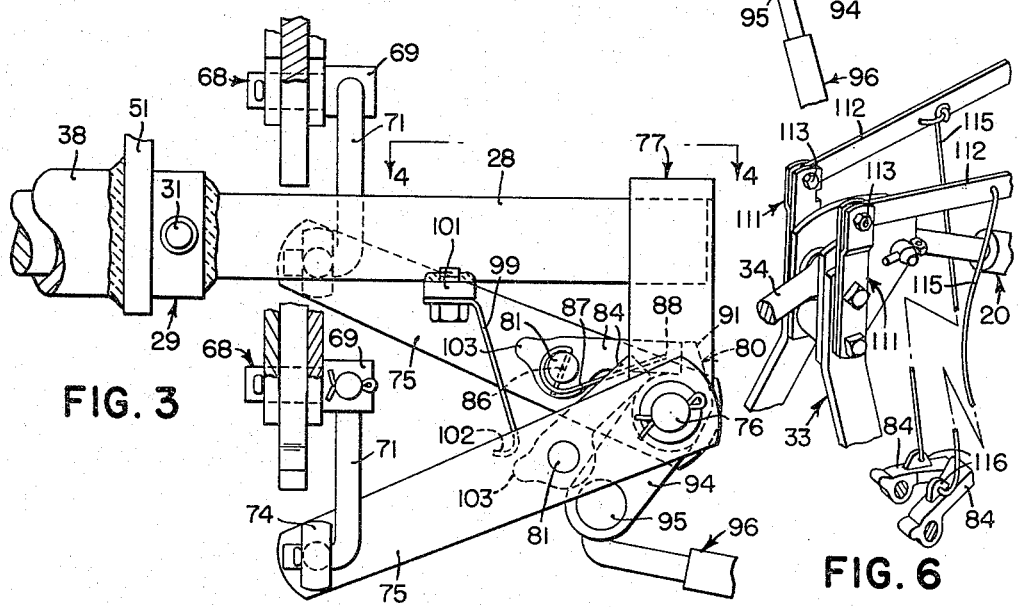
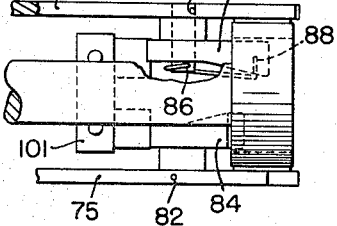

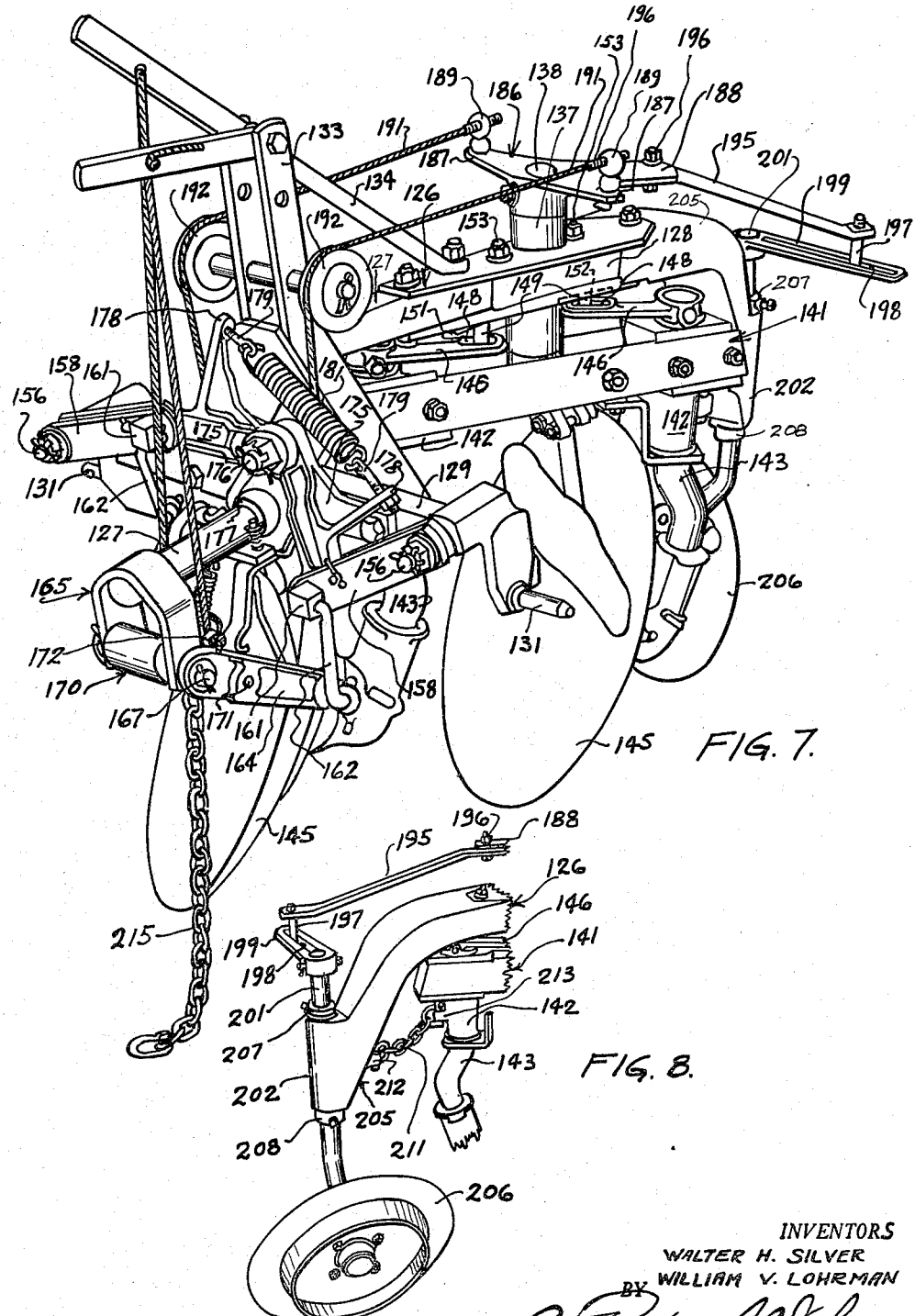

2,963,097

TRACTOR-MOUNTED TWO-WAY PLOW

Walter H. Silver, Brownsville, Tex., and William V. Lohrman, Davenport, Iowa, assignors, by mesne assignments, to Deere & Company, a corporation of Delaware Continuation of abandoned application Ser. No. 581,783, Apr. 30, 1956. This application Apr. 16, 1959, Ser. No. 806,829

31 Claims. (Cl. 172—210)

This application is a continuation of our co-pending application, Ser. No. 581,783, filed April 30, 1956, for Tractor-Mounted Two-Way Plows, now abandoned, which is a continuation-in-part of our earlier application, Ser. No. 350,605, filed April 23, 1953, for Tractor-Mounted Two-Way Plows, now abandoned.

The present invention relates generally to agricultural implements and more particularly to two-way plows.

The object and general nature of the present invention is the provision of an automatically reversible two-way plow especially constructed and arranged for connection to a propelling and supporting tractor through upper and lower power-controlled connecting links, such as the implement-supporting linkage shown, for example, in the patent to Ferguson 2,437,879, issued March 16, 1948. It is a further object of this invention to provide an automatically reversible two-way plow which is simple in construction, positive in action and economical to manufacture and maintain.

An additional feature of this invention is the provision of a two-way plow in which means is provided for automatically adjusting the position of either plowing unit, when in operating position, independently of the adjustment for the other unit.

Another feature of this invention is the provision of a pair of toggle links operative alternately for locking the plow units in operating position, the position adjusting means being effective through the locking toggle mechanism. Further, it is another feature of this invention to provide a tractor-mounted two-way plow adapted to be raised and lowered into and out of transporting and operating positions, with means automatically responsive to raising and lowering movement of the plow as a whole, relative to the tractor, for automatically reversing the plow. An additional feature of this invention is the provision of automatically operating reversing mechanism, especially adapted for two-way plows and the like, whereby successive movements of the implement, relative to the tractor, produce an automatic reversal of the associated parts.

A further feature of this invention is the provision of a moldboard type of plow incorporating the above mentioned automatically operating reversing mechanism, and, still further, another feature of this invention is a provision of a reversible disk plow in which the above mentioned automatically operating reversing mechanism is incorporated.

These and other objects of the present invention will be apparent to those skilled in the art after a consideration of the following detailed description, taken in conjunction with the accompanying drawings, in which:

Fig. 1 is a rear view of a tractor and two-way plow combination in which the principles of the present invention have been incorporated.

Fig. 2 is a fragmentary perspective view of the principal portions of the automatic reversing mechanism, showing the parts in the position they occupy when the plow bottom that was formerly in operating position has been unlocked and the right- and left-hand plow bottoms held in balanced position on the plow frame, the plow bottoms being held above the ground a distance sufficient to accommodate turning at the end of a field or for transport from one position to another.

Fig. 3 is an enlarged fragmentary side view, showing the principal portions of the automatic reversing mechanism in substantially the positions they occupy when the right-hand plow bottom is in operating position, as in Fig. 1.

Fig. 4 is a fragmentary plan view of some of the parts shown in Fig. 3, being a view taken generally along the line 4—4 of Fig. 3.

Fig. 5 is a fragmentary view, similar to Fig. 3, showing the positions of the parts during the raising of one plow bottom and the lowering of the other.

Fig. 6 is a fragmentary perspective view, showing hand operated means effective to prevent the normal automatic reversal of the plows.

Fig. 7 is a fragmentary perspective view showing a modified form of the present invention, illustrating the same as incorporated in an integral or tractor-mounted two-way reversible disk plow.

Fig. 8 is a fragmentary view showing the swing limiting means.

The tractor, which is indicated in its entirety by the reference numeral 10, is shown for purposes of illustration as including a generally longitudinally extending tractor body 11 to which a rear axle structure 12 is connected, the latter structure receiving axle shafts to which drive wheels 14 are connected. The tractor 10 also includes a power plant supported by the tractor body 11 and from which energy is derived for actuating a controllable power lift unit 15. The latter unit includes a transverse rockshaft 16 to the ends of which lift arms 17 are fixed. The tractor is provided with conventional three-point linkage, indicated in its entirety by the reference numeral 20, and shown as comprising a pair of lower tension links 21, an upper link 22, and lift links 23 connecting the lower links 21 with the power lift arms 17. The front ends of the upper and lower links 21 and 22 are connected with the tractor through ball joint connectors, and the rear ends of the links 21 and 22 carry similar ball joint connectors adapting the links to receive an implement, such as the two-way plow indicated in its entirety by the reference numeral 25.

The plow is illustrated as including a main frame 26, made up of a generally fore-and-aft extending bar or shaft, having a rear section 27 and a front section 28, and a transverse frame section 29 carrying studs 31 at its laterally outer end portions. The transverse section 29 also includes an upwardly extending upright or mast portion 33, with the strut or brace 34 extending rearwardly and downwardly from the upper end of the mast portion 33 to a bracket 35 rigidly fixed to the rear end of the rear frame section 27.

Mounted for rocking movement on the rear frame section 27 is a sleeve 38 to which a pair of brackets 39 are securely fixed, as by welding. The brackets 39 are disposed generally normal with respect to one another, the brackets 39 shown in the drawings being arranged at an angle of 80°, for purposes of illustration. The brackets 39 are apertured along their rear edges to receive bolts 41 that connect the associated plow standards 42 thereto. The lower end of each plow standard 42 receives the associated plow bottom 43, which is shown as of the moldboard type. It is to be understood, however, that other types and/or kinds of furrow-opening means may be used, and the term "plow bottoms" is therefore to be understood as referring generically to any kind of furrow-opening means or the like having right- and left-hand operations.

The reversing mechanism, which is indicated in its entirety by the reference numeral 50, will now be described. An arm 51 is fixed, as by welding, to the forward end portion of the sleeve 38 and lies in a generally radial plane substantially bisecting the angle between the brackets 39. Fixed to the upper end of the arm 51 and extending forwardly therefrom is a pivot pin 52, and connected to act between the pivot 52 on the arm 51 and the laterally outer portion of the transverse frame section 29 is a pair of plow rocking means 53, shown as consisting essentially of two pairs of toggle links, each pair including a laterally inner link 54 and a laterally outer link 55. Each laterally inner link is pivotally connected at its inner end through the pivot 52 with the upper end of the arm 51. Each laterally outer link 55 of each pair of toggle links 54, 55 comprises a pair of strap members 56 pivotally interconnected with the laterally outer end of the associated inner link 54 and rigidly connected at their outer ends by a bushing 57 and mounted, through the latter, on a generally fore-and-aft extending pivot 58 that is secured to and forms a part of a reaction member 60 adjustably fixed to the transverse frame portion 29. Each reaction member 60 includes a short section 61 receiving the associated pivot 58 and an angle member 62 adapted to embrace the associated portion of the transverse frame section 29, the flange of the angle member 62 being slotted, as at 65, to receive fastening means 66, preferably in the form of cap screws or bolts, by which the angle 62 may be fixed rigidly to the transverse frame portion 29. The slots 65 are disposed laterally and accommodate a movement of the reaction member 60 relative to the associated frame portion 29. Each laterally outwardly disposed link member 55 constitutes a laterally inwardly extending member pivoted through the part 58 with the associated transverse frame portion 29.

The adjacent ends of the toggle links 54 and 55 are interconnected through a pivot member 68 in the nature of a pin having an apertured head 69 in which the upper end of a motion-transmitting link 71 is rockably received. The lower end of each link 71 is shaped to rockably receive the eye of an eyebolt 74 pivotally connected to the outer end of an associated arm 75 that is pivotally connected, as by a short cross shaft 76, with a depending bracket 77 fixed to the forward portion 28 of the plow frame. The bracket 77 comprises a bifurcated member having lower depending portions 79 not only receiving the pivot 76 but also receiving an operating member 80 disposed between the bracket sections 79 and rockable relative to the plow frame about the axis defined by the cross pin 76. Each arm 75 carries a stud 81 fixed thereto, as by a pin 82 (Fig. 4), whereby the stud is held against rotation on the associated arm. A latch or pawl member 84 is pivotally mounted on each of the studs 81, and the inner end of each stud 81 is apertured to receive one end 86 of a coil spring 87, the other end 88 of which extends into an opening formed in the forward portion of the associated latch or pawl 84. Thus, as will best be seen from Fig. 3, each of the springs 87 acts to urge the associated latch or pawl 84 to move toward the operating member 80. Preferably, the latter carries an upstanding abutment section 91 in the form of a shouldered section that is adapted to engage the ends of the pawl or latches 84 alternately for the purpose of swinging the arms 75. The operating member 80 carries a lower bifurcated arm section 94 in which a trunnion 95 is rockably disposed. The trunnion 95 is apertured to receive the rear end of a link member 96, the forward end of which is pivotally connected to a bracket 97 that is adapted to be fixed to the drawbar support 98 of the tractor 10, or to some other convenient and generally stationary part at the rear of the tractor. As will be seen from Fig. 1, whenever the plow is raised with respect to the tractor, the distance between the cross pin 76 and the bracket 97 increases, which causes the operating member 80 to be rocked or rotated in a counterclockwise direction (Fig. 3), and if either of the latches 84 engages the abutment section 91, such latch, together with the arm 75 associated therewith, will be swung in a counterclockwise direction.

The aforesaid relative movement between the plow frame and the tractor, when the plow is raised, is made use of for automatically reversing the plow bottoms, using the rocking action of the operating member 80 as part of the means for performing this function. Each pawl or latch 84 is controlled in its action by a depending spring member 99, the springs 99 being fixed to the forward frame section 28 alongside one another by means of a cross piece 101 that receives the upper ends of the springs 99 and is fixed, as by welding, to the frame section 28. The lower end of each spring 99 is curved downwardly and rearwardly, as indicated at 102. The curved end 102 of each spring cooperates with a generally rearwardly extending lug or projection 103 formed on the associated latch or pawl 84, generally at the side of the pivot axis of the latch opposite the main body portion or the abutment-engaging portion.

An arm 105 is connected in upstanding relation to each of the laterally inner links 54, and a spring member 106 is disposed transversely of the plow and is connected at its laterally outer ends, through adjustable means if desired, with the upper ends of the arms 105. The function of the spring 106 is to swing one or the other of the toggle linkages into or slightly past its dead-center relationship when the action of the operating member 80 serves to bring one or the other of the pairs of links into a position approaching its dead-center or straight-line relationship. The locked position of each pair of toggle links 54, 55 is determined by a stop pin 108 on the link 55 and a stop lug 109 on the link 54.

In order to accommodate conditions where it is not desired to have the plows reversed each time the hitch frame is raised as, for example, when crossing grassed waterways or the like, we provide means for temporarily disabling the automatic reversing apparatus. Referring now to Fig. 6, the upper portion of the mast section 33 carries a pair of brackets 111. Each bracket comprises a pair of strap members spaced apart at their upper ends and receiving a hand lever 112 therebetween. A pivot bolt 113 connects the upper portions of each of the bracket straps, and the bolts 113 are tightened with sufficient force to normally hold the hand levers 112 in any position to which they are moved. Each hand lever 112 is connected by a flexible cable 115 with the associated latch or pawl 84, each of the pawls 84 having an apertured lug 116 to which the lower end of the associated cable 115 may be connected.

By raising one or the other of the handles or levers 112, a pull will be exerted through the associated cable 115 to elevate the associated pawl 84 and prevent the same from moving downwardly into the path of movement of the operating abutment section 91. Thus, the implement may be raised and lowered, as desired, without reversing the plow bottoms.

The operation of the two-way plow in which the principles of the present invention have been incorporated is substantially as follows.

Starting from the position shown in Fig. 1, an operating position in which the right-hand plow bottom casts a furrow slice in a right-hand direction, as the power lift 15 of the tractor is actuated to cause the lift arms 17 to raise the links 21 upwardly, raising both plows a certain amount relative to the tractor, the operating member 80 is swung in a counterclockwise direction (Fig. 3), moving relative to the arm 75 and bringing the abutment section 91 into contact with the left hand pawl 84, as shown in Fig. 3, thus exerting a force through the left-hand pawl 84 to swing the left-hand arm 75 downwardly. The first or initial movement of the left-hand arm 75 downwardly acts initially to break the left-hand toggle linkage, shifting the same out of its substantially straight-line relation (Fig. 1), in which it held the right-hand bottom in an operating position, and then acting through the left-hand toggle links 54 and 55 to swing the arm 51 toward the left, thus lowering the left-hand bottom. However, it will be seen from Fig. 1 that the left-hand movement of the arm 51 acts through the right-hand toggle links 54 and 55 to raise the right-hand arm 75, which also raises the right-hand pawl 84. As the latter is elevated the lug 103 comes into contact with the lower or cam portion 102 of the associated spring member 99 so that further raising of the right-hand arm 75 causes the right-hand spring 99 to hold the pawl 84 out of engagement with the operating member 80 until the pawl 84 is clear of the abutment section 91, as shown in full lines in Fig. 5 at which time the right-hand pawl drops down onto the abutment section 91. As the continued rocking of the operating member 80 acts through the engaged left-hand pawl 84 to continue the downward movement of the left-hand plow bottom and upward movement of the right-hand plow bottom, the left-hand pawl 84 is shifted downwardly, but the contact between the lug or extension 103 on the left-hand pawl 84 and its associated spring 99 does not change the position of the left-hand pawl 84 at this time, because, first, the force exerted between the operating member 80 and the front end of the left-hand pawl 84 tends to resist any displacement of the left-hand pawl 84 and, second, the downward movement of the left-hand pawl extension 103 relative to its associated spring 99 also tends to hold the front end of the left-hand pawl in an abutment-engaging position. The spring members 99 are so constructed and arranged that each pawl 84 is freed of control by the spring member as soon as the front end of the pawl extends forwardly beyond the abutment section 91 of the counterclockwise moving operating member 80.

When the plows are in a balanced position, as shown in Fig. 2, they are raised sufficiently high above the ground to accommodate turning of the outfit at the end of the field and/or transport from place to place, as desired, the plows being maintained in a relatively low position so that excessive power requirements are not necessary to bring the plow from an operating position into a transport position. After the outfit has been turned around the lowering of the left-hand bottom and the raising of the right-hand bottom may be completed by raising the plow as a whole upwardly beyond its transport position. Such additional raising of the plow relative to the tractor swings the left-hand arm 75 downwardly an additional amount and this brings the right-hand toggle links 54 and 55 toward their straight-line or dead-center relationship, at which time the spring 106 comes into action and insures the movement of the right-hand links 54 and 55 into and preferably slightly beyond their dead-center or straight-line position, which is a position locking the left-hand bottom against displacement out of an operating position. The tractor power lift 15 is then operated to lower the implement to bring the left hand bottom into working position, and this lowering of the implement swings the operating member 80 in a clockwise direction (Fig. 3) so that the right-hand pawl now drops down behind the abutment section 91 into a position to be engaged thereby the next time the implement is raised.

After operation of the unit with the left-hand bottom in plowing position, another cycle of raising the plow into, first, its transport position and, later, into a completely raised position, results in another reversal of the plow bottoms in substantially the same way as the operation as just described, except that now the movement of the operating member 80 resulting from the raising of the plow frame relative to the tractor will act through the right-hand latch or pawl 84 to break the right-hand toggle linkage 54, 55 and subsequently swing the plows over and cause the left-hand toggle links 54, 55 to move into their locking or dead-center relation.

Reference was made above to the fact that each of the reaction members 60 is laterally adjustable on the associated portion of the transverse frame section and that each reaction member may be adjusted independently of the other. The left-hand reaction member controls the operating position of the right-hand plow bottom, and the adjustment of the right-hand reaction member adjusts the position of the left-hand plow bottom.

The form of the invention shown in Fig. 7 includes a main frame 126 that is made up of a generally fore-and-aft extending section 127, a rear section 128 and a transverse bar section 129 carrying studs 131 at its opposite ends, the studs 131 extending laterally outwardly for receiving the draft links of a propelling tractor, such as the links 21 described above and shown in Fig. 1. The main frame section also includes a generally upwardly extending mast section 133 with a brace or strut 134 extending downwardly and rearwardly from the upper end of the mast portion 133 to suitable connecting means rigidly fixing the rear or lower end of the brace 134 to the rearwardly extending frame section 128.

The rearwardly extending frame section 128 includes a vertically extending sleeve section 137 in which a vertical shaft 138 is mounted for rocking movement. The lower end of the shaft is fixed by any suitable means to a laterally rockable beam member 141 to the generally central portion of which the lower end of the vertical shaft 138 is fixed. Each end of the section 141 carries a bearing block 142 in which the upper portion of a generally vertical disk spindle 143 is rockably disposed. A furrow opener in the form of a concave disk 145 is mounted for rotation on the lower end of each of the spindles 143. An arm 146 is fixed at one end to the upper end of each of the disk spindles 143, each arm 146 being disposed directly above the associated bearing block 142. The outer end of each of the arms 146 carries a slot 148 in which a pin 149 is disposed. Each pin 149 is supported on an angle adjusting plate, the front angle adjusting plate being indicated at 151 and the rear angle adjusting plate being indicated at 152. Each of the angle adjusting plates 151 and 152 is adjustable relative to the associated main frame beam section 128. The disk angle may be varied, as desired, by loosening the bolts holding the front and rear disk angle adjusting plates in position and moving the front plate forward and the rear plate rearwardly, or vice versa, and then tightening the associated bolts 153. To provide for the aforesaid adjustment, the front and rear angle adjusting plates are slotted to receive the bolts 153.

The disk-supporting beam 141 is rockably mounted by virtue of its connection with the main frame structure 128 through the rockshaft 138, and by swinging the disk beam 141 from one side to the other, the disks 145 are reversed. The meann for shifting the position of the disk beam 141 will now be described.

Generally speaking, the beam 141 is swung about its axis of rocking movement by substantially the same reversing linkage described above and shown in Figs. 1–6. A stud 156 is fixed, as by welding, to each end of the transverse frame bar 129, and each stud 156 has a reduced forward end on which a link member 158 is rockably disposed. The laterally inner ends of the links 158, opposite the ends that are rockably mounted on the studs 156, are apertured to receive swivel pins 161, the forward or head portions of which are apertured to receive the upper ends of generally vertical links 162, there being one link 162 for each swivel member 161. The lower end of each of the links 162 is swivelly connected to the rear end of an associated reversing arm 164, there being two of such arms 164 rockably mounted on a generally U-shaped bracket 165, the bight portion of which is securely fixed, as by welding, to the forward end of the forward frame section 127. Preferably, the arms 164 are rockably mounted on a cross pin 167 that extends transversely through apertures in the lower portions of the bracket 165, the pin 167 rockably receiving an operating member 170, which has substantially the same function, as do other parts, as the operating member 80, described above, and associated parts. Each arm 164 carries a laterally inwardly extending stud 171 on which a latch or pawl member 172 is pivoted, these latches or pawls cooperating with the operating member 170 in substantially the same manner as the latches or pawls 84 cooperating with the operating member 80.

The swivel members 161 serve also to connect the links 158 with associated inner link members 175, the laterally inner ends of the link members 175 being interconnected by a pivot bolt 176 that serves to connect the link members 175 to a rocking arm 177 mounted on the rear portion of the forward frame extension section 127. Uprights 178 are carried on each of the link members 175 and at their upper ends receive eye bolts 179 by which a tension spring 181 is connected with the upright sections 178. By virtue of the rocking arm 176, acting in cooperation with the spring 181, whenever one of the links 158 is disposed in a lower position, the other link 158 lies in an upwardly overcenter position with respect to the associated link 175, their parts remaining in this position until the associated arm 164 is forcibly shifted in a downward direction to break the toggle joint and swing the reversing linkage over into the other position.

The means by which the reversing linkage, just referred to, is connected to swing the disk beam 141 from one position to another will now be described.

Secured to the upper end of the spindle 138 is a lever 186 having two laterally outwardly extending arms 187 and a rearwardly extending arm 188. Each of the laterally outwardly extending arms 187 is apertured to receive a swiveled connector 189 to which the rear end of a cable 191 is connected. Each of the cables 191 extends forwardly, passing over pulleys 192 mounted on an upper portion of the mast section 133, the cables 191 extending downwardly and being connected in any suitable way to the rear portion of the associated swivel members 161. By virtue of this connection, whenever one or the other of the arms 158 is swung downwardly, a pull is exerted through the associated cable that acts to swing the bell crank 186 and the associated disk frame 141 from one position to another. By virtue of this swinging movement of the disk frame 141, the disks 145 are themselves reversed by virtue of the connections of the cranks 146 with the associated pins 149, as described above.

An extension 195 is carried by the rearwardly extending bell crank arm 188, being connected to the latter by means of a pair of bolts 196, and the rear end of the extension 195 carries a pin 197 that is disposed in a slot 198 formed in an arm 199 that is connected rigidly to the upper end of a rear wheel spindle 201. The spindle 201 is journaled for rocking movement in a sleeve section 202 fixed to the rear casting 205 that forms a part of the main frame 126. A rear furrow wheel 206 is journaled on the lower end of the spindle 201. By virtue of the extension 195 and associated parts, whenever the disk frame 141 is swung from one position to another, the rear furrow wheel is also reversed. Adjustable set screw collars 207 and 208 are provided to maintain the spindle 201 in the proper vertical position relative to the rear portion of the main frame.

Suitable stop means is provided for limiting the swinging of the disk frame 141. As will be seen from Fig. 7, the disks 145 are so arranged that they occupy a position with respect to the axis of the vertical spindle 138 such that the soil pressure against the disks 145 in operation tends to hold the disk frame 141 over in an operating position. Such stop means may take the form of a chain 211 fixed to a lug 212 on the casting 205 and to a lug 213 formed on the rear spindle sleeve section 142.

In the form of the invention shown in Fig. 7, the operating member 170 is connected by a chain 215 to an adjacent portion of the associated tractor, the chain 215 serving substantially the same function as the connection 96 shown in Fig. 1. By virtue of the pressure of the soil against the disk 145, the cables 191 are required only to shift the bell crank 186, and the associated disk frame 141, from one position slightly past dead center over toward the other position, soil pressure then acting to complete the reversing movement of the disk frame 141, which movement is terminated by the stop chain 211.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A two-way plow adapted to be connected with a tractor of the type including upper and lower, generally vertically swingable links and means for raising and lowering the latter, said plow comprising generally upright frame means adapted to receive the rear end portions of said upper and lower links and having a rearwardly extending section and a forwardly extending section, a plow frame swingable on said rearward section, an arm fixed to the forward portion of said plow frame, a rockable member carried by said forwardly extending section and adapted to be connected with said tractor to be rocked relative to said frame means when the latter is raised or lowered, a pair of arms swingably mounted on said frame means and connected to the arm fixed on said plow frame to swing said plow frame, a pair of alternately operable connections between said swingably mounted arms and said rockable member for swinging said plow frame when the latter and said frame means are moved generally vertically, and means maintaining one of said connections inoperative when the other is operative.

2. A two-way plow adapted to be connected to a tractor of the type including generally vertically swingable upper and lower links and means for raising and lowering the latter, said plow comprising a generally upright frame means having a transverse section at the lower portion and forward and rearward extensions rigid therewith, means at the upper portion of said frame means and at the ends of said transverse section to swingably receive the rear ends of said upper and lower links, a plow frame carrying a pair of oppositely arranged plow bottoms and mounted for rocking movement on said rearward extension, a pair of pivotally interconnected links connected between each side of said transverse section and said swingable plow frame, a pair of arms swingably mounted on said forward frame extension and connected respectively with said pairs of links, a part adapted to be connected with the tractor, and means connected with said part and alternately with said arms for reversing said plow frame by the elevation of said frame means relative to the tractor.

3. In a two-way plow, a frame, a pair of plow bottoms movable alternately into plowing position, a pair of interconnected parts movable generally in opposite directions and connected, respectively, with said plow bottoms, a pawl pivoted to each of said parts, an operating member movable between spaced apart end positions and having an abutment section engageable with said pawls, alternately, for shifting the one of said parts associated therewith, and means carried by said frame and having a one-way connection with each of said pawls whereby, when either of said pawls is engaged by the abutment section of said operating member and movement of the latter moves said parts in opposite directions, said means acts to hold the other pawl out of an abutment-engaging position until one end of the pawl passes over said abutment section.

4. In a two-way plow, frame means, and reversing mechanism comprising a pair of interconnected parts carried by said frame means and simultaneously movable generally in opposite directions, one with respect to the other, a pawl pivoted to each of said parts, an operating member movable between spaced apart end positions and engageable with said pawls, alternately, for shifting the one of said parts associated therewith, and means fixed to said frame means and engageable with said pawls for holding the pawl carried by the other of said parts out of member-engaging position during a portion of the path of movement of the associated part.

5. In a two-way plow, a frame having forward and rear extensions, a pair of right- and left-hand plow bottoms rockably mounted on said rear extension, an operating member mounted on said forward extension for movement relative thereto about a transverse axis, a pair of arms also mounted on said forward extension for movement about a transverse axis, means interconnecting said arms and said plow bottoms whereby movement of one or the other of said arms in one direction relative to said frame swings the plow bottoms about said rear frame extension, a latch pivotally mounted on each arm and normally biased toward a position in the path of movement of said operating member, and means on said frame and engageable with either latch, when the other is engaged by said operating member, for holding it out of the path of movement of said operating member.

6. In an agricultural implement, a frame, an operating member and a pair of arms mounted on said frame for swinging movement relative thereto about axes extending in the same direction, a pawl pivoted on each arm and swingable toward and away from engagement with said operating member, means biasing said pawl to move toward said operating member to be engaged thereby when the latter is moved in one direction, means interconnecting said arms so that when either is moved in one direction the other is moved in the opposite direction, and a pair of pawl-controlling members mounted on said frame, one adjacent each pawl and so mounted relative thereto that when either arm is moved in said opposite direction the pawl carried by that arm is held out of engagement with said operating member until the latter passes said last named pawl.

7. The invention set forth in claim 6, further characterized by said pawl-biasing means comprising a pivot carried by the associated arm and on which said pawl is mounted, means fixing said pivot to said arm, and a spring having one end reacting against said pivot and the other end bearing against said pawl.

8. The invention set forth in claim 6, further characterized by each of said pawls having its main body portion extending toward said operating member and, at the opposite side of its pivot axis, an extension, the associated pawl-controlling member being resilient and having a section positioned to engage said pawl extension and hold the opposite main body portion out of the path of movement of said operating member.

9. The combination of a frame, an operating member pivoted thereto for oscillating movement, an abutment section on said member, a pair of alternately operable arms pivoted to said frame, means interconnecting said arms to constrain them to move in generally opposite directions, a pawl on each arm, each pawl being disposable in the path of movement of said abutment section so that movement of said abutment section toward and into engagement with one of said pawls serves to swing the associated arm in one direction and the other arm in the opposite direction, and means on said frame responsive to movement of said other arm toward said frame and engageable with the pawl associated with said other arm for holding said latter pawl in a position out of the path of movement of said abutment section.

10. The combination of a frame, an operating member pivoted thereto for oscillating movement, an abutment section on said member, a pair of alternately operable arms pivoted to said frame, means interconnecting said arms to constrain them to move in generally opposite directions, a pawl on each arm, each pawl being disposable in the path of movement of said abutment section so that movement of said abutment section toward and into engagement with one of said pawls serves to swing the associated arm in one direction and the other arm in the opposite direction, and means on said frame responsive to movement of said other arm in said opposite direction and engageable with the pawl associated with said other arm for holding said latter pawl in a position out of the path of movement of said abutment section, said pawl-holding means comprising a resilient element carried by said frame and disposed in such position as to have a portion lying in the path of movement of the associated pawl when the arm carrying the latter is swung from one position to another.

11. The invention set forth in claim 10, further characterized by said pawl-holding resilient element being located at one side of the pawl pivot whereby when the associated arm is moved in one direction said resilient element tends to hold the pawl against said operating member and when the arm is moved in the other direction the pawl is held out of contact with the abutment section on said arm.

12. A two-way plow comprising a main frame including a generally fore-and-aft extending portion and a transverse portion, a part carrying a pair of opposite plow bottoms and mounted for rocking movement on said fore-and-aft extending frame portion, a pair of separately operable plow shifting means carried by the transverse frame portion and each including a reaction member connected to receive the reaction of said plow shifting means, each reaction member being independently adjustable relative to the other reaction member, and means adjustably fixing each reaction member to said transverse frame portion.

13. A two-way plow comprising a main frame including a generally fore-and-aft extending portion and a transverse portion, a part carrying a pair of opposite plow bottoms and mounted for rocking movement on said fore-and-aft extending frame portion, two pairs of toggle links, each pair including two pivotally interconnected links arranged transversely of said frame with the inner link connected with said part at a point spaced from its axis of rocking movement and the outer end of the outer link connected with said frame, a pair of means adjustable along said transverse portion and pivotally receiving, respectively, the outer ends of said outer links, means connected with each of said outer links for shifting one or the other of said outer links into a straightened position relative to the associated inner link so as to optionally lock either plow bottom in operating position.

14. A two-way plow comprising a main frame including a generally fore-and-aft extending portion and a transverse portion, a part carrying a pair of opposite plow bottoms and mounted for rocking movement on said fore-and-aft extending frame portion, two pairs of toggle links, each pair including two pivotally interconnected links arranged transversely of said frame with the inner link connected with said part at a point spaced from its axis of rocking movement, an arm fixed to each of the laterally inner links, resilient means connected with said arms and acting therethrough to swing the toggle links approaching a dead-center position into a locked position, and operating means connected with each of said pairs of toggle links for swinging one pair toward its dead-center position and acting therethrough to reverse the positions of said plow bottoms.

15. A two-way plow comprising a main frame including a generally fore-and-aft extending portion and a transverse portion, a part carrying a pair of opposite plow bottoms and mounted for rocking movement on said fore-and-aft extending frame portion, an arm fixed to said part and extending generally vertically, a pair of generally laterally inwardly extending members pivotally connected, respectively, with the laterally outer ends of said transverse frame portion, means for alternately swinging said members, and motion-transmitting means operatively connecting the inner end portions of said members with said arm.

16. In a two-way plow, reversing mechanism comprising a pair of parts, means interconnecting said parts so that when one is moved in one direction the other part is moved in the other direction, a pawl pivoted to each of said parts, an operating member movable between spaced apart end positions and engageable with said pawls, alternately, for shifting the one of said parts associated therewith, and manually operated means for selectively holding either of said pawls in an inoperative position, to provide for controllable disabling of the reversing mechanism.

17. A two-way plow comprising a supporting shaft disposable in a generally fore-and-aft extending position, a crossbar fixed to the supporting shaft adjacent the forward end thereof, a sleeve mounted for rocking movement on said shaft rearwardly of said crossbar, right- and left-hand plow units fixed to and rockable with said sleeve, an arm fixed to the sleeve adjacent said crossbar and extending generally vertically, pairs of link means movably connected at their inner ends with said arm and at their outer ends with the laterally outer portions of said cross-bar and means carried by the forward portion of said shaft and connected with said link means for shifting said arm and sleeve.

18. A two-way plow adapted to be connected with a tractor of the type including upper and lower, generally vertically swingable links and means for raising and lowering the latter, said plow comprising generally upright frame means adapted to receive the rear end portions of said upper and lower links and having a rearwardly extending section and a forwardly extending section, plow means swingable on said rearward section, a first arm connected with said swingable plow means and movble therewith, a rockable member carried by said forwardly extending section and adapted to be connected with said tractor to be rocked relative to said frame means when the latter is raised or lowered, a pair of arms swingably mounted on said frame means and connected to said first arm to swing said plow means, a pair of alternately operable connections between said swingably mounted arms and said rockable member for swinging said plow means when the latter and said frame means are moved generally vertically, and means maintaining one of said connections inoperative when the other is operative.

19. A two-way plow comprising a supporting member disposable in a generally fore-and-aft extending position, a crossbar fixed to said supporting member adjacent the forward end thereof, a second member connected for swinging movement on said supporting member rearwardly of said crossbar, plow means carried by said second member and shiftable into right and left hand plowing positions when said second member is swung from one position to another, an arm connected to move with said second member and extending generally vertically, pairs of link means movably connected at their inner ends with said arm and at their outer ends with the laterally outer portions of said cross bar, and means carried by the forward portion of said supporting member and connected with said link means for shifting said second member and said plow means.

20. A two-way plow comprising a main frame including a generally fore-and-aft extending portion and a transverse portion, a part carrying plow means and mounted for swingable movement on said fore-and-aft extending frame portion to provide for right and left hand furrows, selectively, a generally centrally disposed arm connected with said swingable part and movable therewith about a fore-and-aft extending axis, two pairs of toggle links, each pair including two pivotally interconnected links extending transversely of said frame with the inner link connected with said arm and said plow-carrying part, to swing the latter, and the outer end of the outer link connected with said frame, and means connected with each pair of said links for shifting one or the other of said outer links into a straightened position relative to the associated inner link so as to optionally lock said swingable part in either of its positions.

21. A two-way plow adapted to be connected with a tractor of the type including upper and lower, generally vertically swingable links and means for raising and lowering the latter, said plow comprising frame means including a generally upright frame section adapted to receive the rear end portions of said upper and lower links, a rearwardly extending section extending rearwardly of said upright frame section and a forward section extending forwardly of said upright frame section, plow means swingable on said rearward section, a rockable member carried by said forwardly extending section for movement relative thereto about a transverse axis and adapted to be connected with said tractor to be rocked relative to said frame means when the latter is raised or lowered, a pair of arms swingably mounted on said forward frame section for movement about a transverse axis and disposed on opposite sides of said rockable member, means connecting said arms with said plow means to swing the latter, a pair of alternately operable connections between said swingably mounted arms and said rockable member for swinging said plow means when the latter and said frame means are moved generally vertically, and means maintaining one of said connections inoperative when the other is operative.

22. A two-way plow comprising a supporting member disposable in a generally fore-and-aft extending position, a crossbar fixed to said supporting member adjacent the forward end thereof, a second member connected for swinging movement on said supporting member rearwardly of said crossbar, plow means carried by said second member and shiftable into right and left hand plowing positions when said second member is swung from one position to another, an arm swingable on said supporting member adjacent said crossbar and extending generally vertically, pairs of link means movably connected at their inner ends with said arm and at their outer ends with the laterally outer portions of said crossbar, and means carried by said supporting member and connected with said link means for shifting said second member and said plow means.

23. A two-way plow comprising a frame having a fore-and-aft extending section and a transverse section, a reversible plow unit rockably mounted on said fore-and-aft extending section, a generally vertically swingable part mounted on each end of said transverse section, a link pivoted to each part, an arm rockably mounted on said frame adjacent the generally central portion of said transverse section, means pivoting each link to said arm, each part and the associated link being swingable into and out of substantially dead-center position, the link and part in substantially dead-center position serving to act through said arm to hold the other part and link in an angled position, operating means connecting the part and link at one side of said frame with said reversible plow unit to swing the latter in one direction, a second operating means connecting the other link and part with said plow unit to swing the latter in the other direction, and means including alternately operable parts connected, respectively, with said swingable parts for alternately swinging the latter and shifting said reversible plow unit.

24. A two-way plow as defined in claim 23, further characterized by stop means acting between said rockably mounted plow unit and said frame for limiting the swinging movement of said plow unit into either of two positions.

25. A two-way plow comprising a main frame including a generally fore-and-aft extending portion and a transverse portion, a part carrying plow means and mounted for swinging movement on said fore-and-aft extending frame portion and operative to shift said plow means so as to form right or left hand furrows, selectively, a pair of plow shifting means carried by the transverse frame portion and each including a reaction member connected to receive the reaction of said plow shifting means, means adjustably fixing each reaction member to said transverse frame portion, each of said plow shifting means including a pair of toggle links disposed generally transversely, and a laterally swingable arm carried by said main frame and connected at one end with said plow carrying part for swinging the latter, the other end of said swingable arm pivotally receiving the inner ends of both of the inner toggle links, and means pivotally connecting the outer toggle links to said adjustable reaction members, respectively.

26. A two-way plow adapted to be connected to a tractor of the type including generally vertically swingable upper and lower links and means for raising and lowering the latter, said plow comprising frame means including a generally upright frame section having means adjacent its upper and lower portion to swingably receive the rear portions of said upper and lower links, a rigid generally rearwardly extending section, and a forwardly extending section, a plow frame carrying furrow opening means disposable alternately in right- and left-hand plowing position, said plow frame being mounted for rocking movement on said rearwardly extending section and movable thereon to shift said furrow opening means from one of said positions to the other, a part adapted to be connected with the tractor, said frame means being moved relative to said part when said tractor links and frame means are raised and lowered, a pair of alternately operable arms swingable on said forwardly extending frame section and connected with said plow frame whereby one arm swings said plow frame in one direction and the other arm swings the plow frame in the other direction, a member shiftably mounted on said upright frame section and operatively connected with said part, and means including alternately operable pawl means connecting said member with said arms so as to act through the latter to swing said rockable plow frame and the associated furrow opening means from one position to the other.

27. In a two-way plow, a frame, a pair of furrow openers movable alternately into right and left hand plowing position, a pair of interconnected parts movable generally in opposite directions and connected to reverse said furrow openers, a pawl pivoted to each of said parts, an operating member movable between spaced apart end positions and having an abutment section engageable with said pawls, alternately, for shifting the one of said parts associated therewith, and means carried by said frame and having a one-way connection with each of said pawls whereby, when either of said pawls is engaged by the abutment section of said operating member and movement of the later moves said parts in opposite directions, said means acts to hold the other pawl out of an abutment-engaging position until one end of the pawl passes over said abutment section.

28. In a reversible disk plow, a frame, a generally vertical furrow wheel spindle journaled in the rear end portion of said frame and swingable about a generally vertical axis through approximately 180°, an inclined rear furrow wheel journaled on the lower portion of said spindle, an arm fixed to the upper end of said spindle, a swingable disk-carrying beam pivotally connected with said frame forward of said spindle, beam-swinging means connected with said beam and having an arm extending generally rearwardly to a point adjacent said first mentioned arm, and means connecting said arms including a slot in one arm and a slot-engaging part on the other arm.

29. A two-way plow comprising a main frame including a generally fore-and-aft extending portion and a transverse portion, a part carrying a pair of oppositely operable plow units and mounted for rocking movement on said fore-and-aft extending frame portion, two pairs of toggle links extending generally laterally inwardly from the laterally outer end portions of said transverse frame portion, each pair including two pivotally interconnected links arranged generally transversely of said frame with the inner link connected with said rockable part at a point spaced from the axis of its rocking movement, a reaction member receiving the outer end of each outer link means, means adjustable relative to said transverse portion and toward and away from the axis of rocking of said part for adjustably fixing each reaction member to the laterally outer part of said transverse frame portion, changing the position of either reaction member on said frame serving to adjust the position of the associated plow unit when in operating position, and means connected with said toggle links for optionally breaking the locked pair of toggle links and shifting said rockable part from one position to the other.

30. A two-way plow comprising a main frame including a generally fore-and-aft extending portion and a transverse portion, a part carrying a pair of oppositely operable plow units and mounted for rocking movement on said fore-and-aft extending frame portion, a member fixed to said part and extending generally outwardly therefrom, two pairs of toggle links, each pair including two pivotally interconnected links, means pivotally connecting the laterally inner toggle link of each pair of links with said member, a reaction member receiving the outer end of each outer link means, means adjustably fixing each reaction member to the plow frame, and shiftable relative to the plow frame generally toward and away from the point of pivotal connection of the associated inner toggle link with said member for adjusting the position of the plow unit in operation, and plow reversing means connected to act through said toggle links for unlocking the locked toggle links and shifting said plow carrying part from one position to the other.

31. A two-way plow as defined in claim 30, further characterized by said main frame being adapted to be mounted on a tractor of the type including power operated means to raise and lower associated implements, means connecting said power operated means with said main frame to raise and lower the latter, and means connected between said plow reversing means and the tractor for unlocking said toggle links and reversing the position of said plow carrying part when said tractor power operated means is actuated to raise said plow.

References Cited in the file of this patent
UNITED STATES PATENTS 2,648,267   Pursche _____ Aug. 11, 1953

FOREIGN PATENTS 822,627   Germany _____ Nov. 26, 1951